United States Patent
Park et al.

(10) Patent No.: US 7,173,377 B2
(45) Date of Patent: Feb. 6, 2007

(54) LIGHT EMISSION DEVICE AND POWER SUPPLY THEREFOR

(75) Inventors: Sung-Chon Park, Suwon-si (KR); Kyoung-Soo Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 68 days.

(21) Appl. No.: 11/128,706

(22) Filed: May 13, 2005

(65) Prior Publication Data

US 2005/0258772 A1   Nov. 24, 2005

(30) Foreign Application Priority Data

May 24, 2004  (KR) ............ 10-2004-0036853
May 24, 2004  (KR) ............ 10-2004-0036867

(51) Int. Cl.
*G09G 3/10* (2006.01)
(52) U.S. Cl. ................ 315/169.1; 315/169.3; 323/271; 323/282; 323/312; 345/77; 345/82
(58) Field of Classification Search ............ 315/169.1, 315/169.3; 323/266, 271, 281, 282, 312; 345/76, 77, 82
See application file for complete search history.

(56) References Cited

U.S. PATENT DOCUMENTS

| | | | | | |
|---|---|---|---|---|---|
| 5,446,367 | A | * | 8/1995 | Pinney | 323/266 |
| 2005/0078065 | A1 | * | 4/2005 | Hayafuji et al. | 345/76 |
| 2006/0055631 | A1 | * | 3/2006 | Yoshida | 345/46 |
| 2006/0077077 | A1 | * | 4/2006 | Kwon | 341/50 |

* cited by examiner

*Primary Examiner*—Haissa Philogene
(74) *Attorney, Agent, or Firm*—Christie, Parker & Hale, LLP

(57) ABSTRACT

A power supply device supplying power to a data driver of a light emission display device. The power supply device includes: an external reference voltage supply supplying an external reference voltage; a reference voltage generator converting external power into a regulated direct current (DC) reference voltage and outputs the regulated DC reference voltage when the external power is changed. A reference voltage selector selects one of the reference voltages output from the external reference voltage supply and the reference voltage generator and outputs a selected reference voltage. A voltage converter converts the regulated reference voltage output from the reference voltage selector into a plurality of internal DC power sources to be supplied to the drivers.

15 Claims, 10 Drawing Sheets

LIGHT EMISSION DEVICE AND POWER SUPPLY THEREFOR

CROSS REFERENCE TO RELATED APPLICATION

This application claims priority to and the benefit of Korean Patent Application Nos. 10-2004-0036853 and 10-2004-0036867 both filed on May 24, 2004 and both filed in the Korean Intellectual Property Office, the entire contents of which are incorporated herein by reference.

BACKGROUND OF THE INVENTION

1. Field of the Invention

The present invention relates to a power supply device for a light emission display device, and more particularly, it relates to a power supply device having a stabilizing circuit for standard voltage to stably provide a data voltage to an integral circuit of a data driver of the light emission display device.

2. Description of the Related Art

In general, an organic electroluminescent (referred to as "EL" hereinafter) display device classifies phosphorus organic components into pixels arranged in a matrix format, and visualizes an image by controlling the amount of current flowing to the phosphorus organic components. Such an organic EL display device is an advanced display which is highly responsive, consumes low power, and has a large view angle. Thus, the organic EL display is expected to be the next-generation display.

Figure 1:
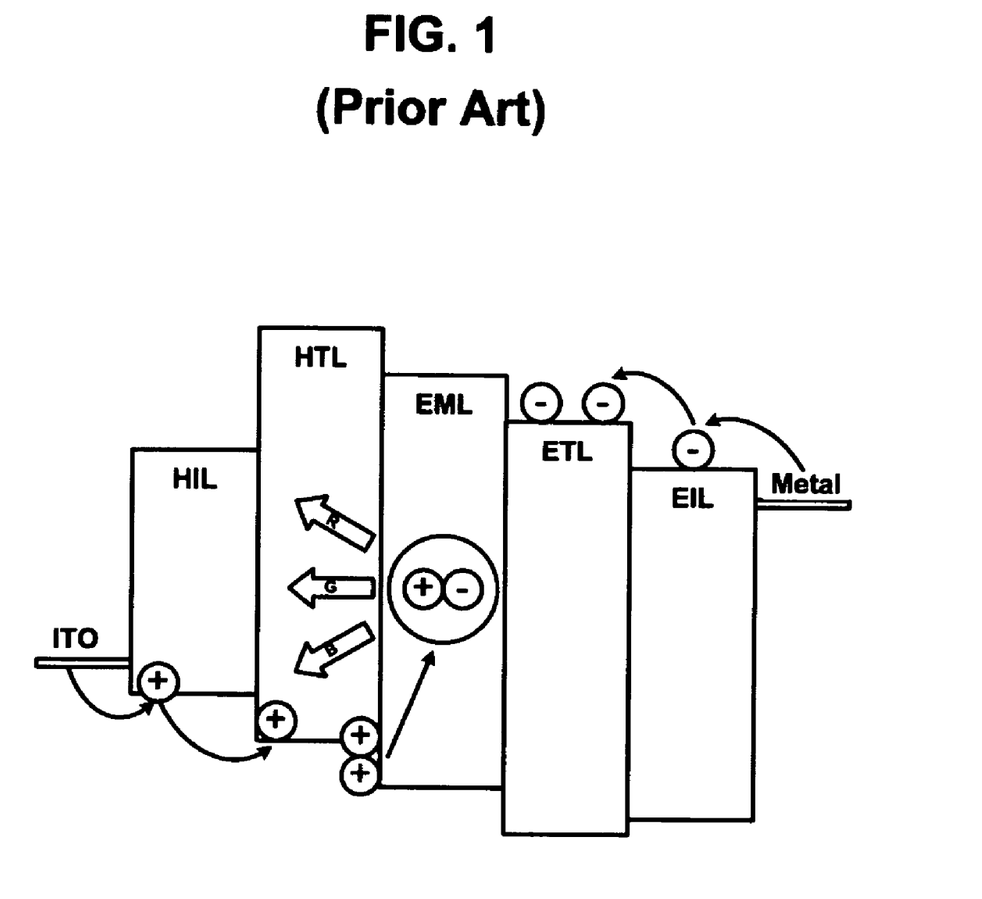
FIG. 1 is a schematic depiction of a light emission mechanism of an organic EL.

FIG. 1 illustrates a light emission mechanism of an organic EL display (hereinafter, alternatively referred to as OLED).

In general, an OLED device electrically excites phosphorus organic components, and visualizes an image by voltage-programming or current-programming M×N numbers of organic light emitting cells. As shown in FIG. 1, these organic light emitting cells include an indium tin oxide (ITO) pixel electrode, an organic thin film, and a metal layer. As shown in FIG. 1, the organic thin film has a multi-layered structure including an emission layer (EML), an electro transport layer (ELT), and a hole transport layer (HTL) so as to balance electrons and holes and thereby enhance efficiency of light emission. Further, the organic thin film separately includes an electron injection layer (EIL) and a hole injection layer (HIL).

Methods of driving the organic light emitting cells having the foregoing configuration include a passive matrix method and an active matrix method. The active matrix method employs a thin film transistor (TFT). In the passive matrix method, an anode and a cathode are formed crossing each other and a line is selected to drive the organic light emitting cells. However, in the active matrix method, each indium tin oxide (ITO) pixel electrode is coupled to the TFT, and the light emitting cell is driven in accordance with a voltage maintained by capacitance of a capacitor coupled to a gate of the TFT.

Figure 2:
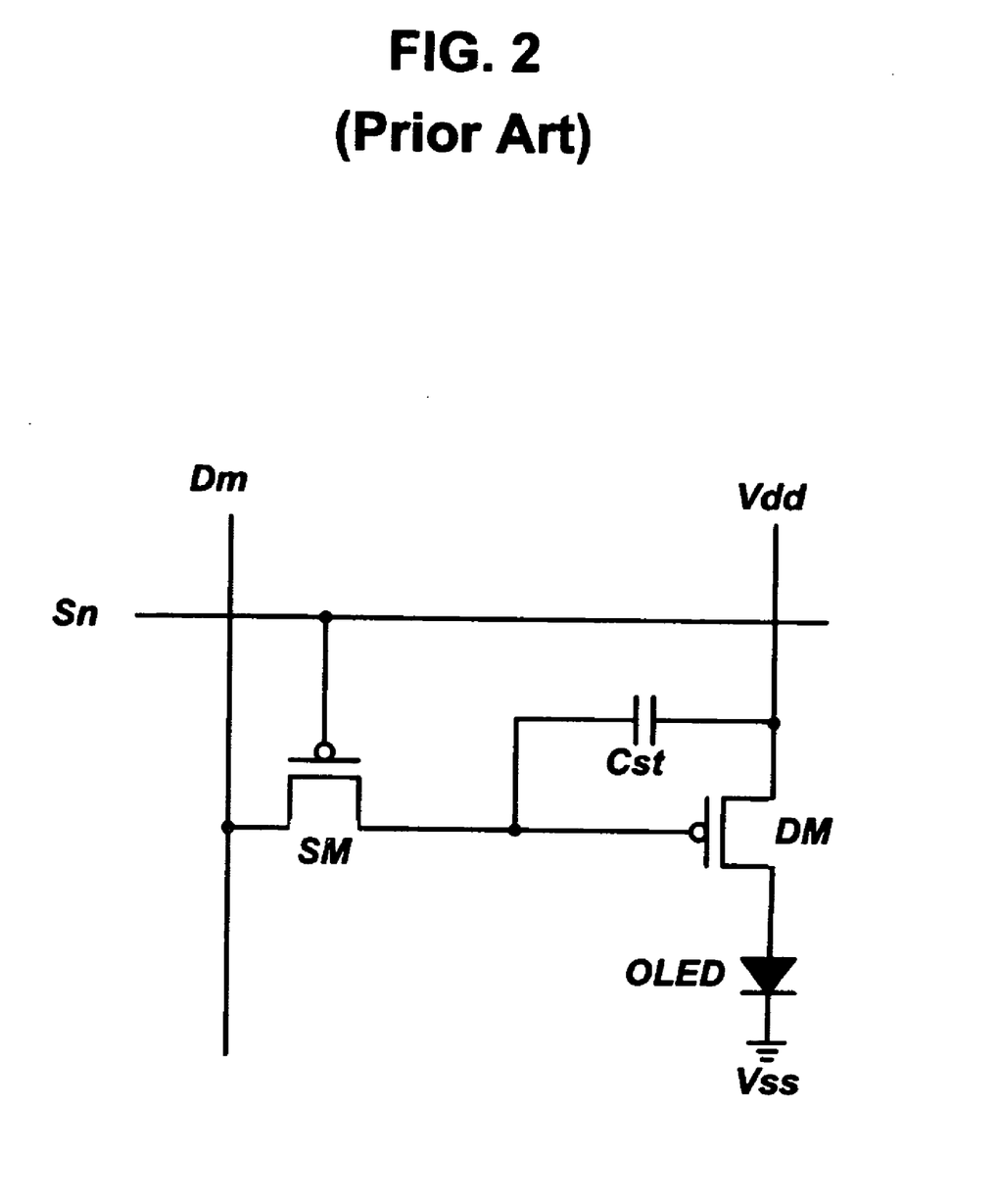
FIG. 2 is a pixel circuit of a typical organic EL.

FIG. 2 illustrates a pixel circuit of a typical OLED. The pixel circuit includes an OLED, a driving transistor DM, a switching transistor SM, and a capacitor Cst. The driving transistor DM and switching transistor SM may each be provided as a PMOS transistor.

A source of the driving transistor DM is coupled to a power voltage VDD, and the capacitor Cst is coupled between a gate and a source of the driving transistor DM. The capacitor Cst maintains a gate-source voltage at the driving transistor for a predetermined period of time, and the switching transistor SM transmits a data voltage from a data line Dm to the driving transistor DM in response to a selection signal from a current scan line Sn.

A cathode of the OELD is coupled to a reference voltage Vss, and the OLED emits light corresponding to a current applied thereto through the driving transistor DM. Herein, the reference voltage Vss coupled to the cathode of the OLED is lower than the power voltage VDD, and accordingly a ground voltage may be applied thereto.

The data voltage of an OLED display is generated by a direct-current/direct-current (DC/DC) converter (typically employing a charge-pump method) provided in an integral circuit IC of the data driver using external power. The data voltage affects brightness and contrast of a display panel. However, the data voltage may be increased or decreased when there is a sudden drop in the external power or an occurrence of noise, and instability of the data voltage affects the brightness and the contrast of the panel.

SUMMARY OF THE INVENTION

Accordingly, the present invention provides a regulated reference voltage to the light emission display device regardless of external power variation and provides a regulated voltage to the data driver of the light emission display device.

In addition, the present invention provides a light emission display device having a reference voltage regulation circuit capable of selectively supplying a regulated reference voltage to a data driver IC without regard to the external power variation.

In an aspect of the present invention a power supply device supplying power to a light emission display device includes: a reference voltage regulator and a voltage converter. The reference voltage regulator converts external power into a regulated direct current (DC) reference voltage and outputs the regulated DC reference voltage. The voltage converter converts the regulated reference voltage output from the reference voltage regulator into a plurality of internal DC power sources to be respectively used in drivers of the power supply device.

The power supply device further includes a controller. The controller allows a direct use of the regulated reference voltage, or distributes the regulated reference voltage to respectively be converted into a plurality of internal DC power sources for the drivers.

The reference voltage regulator may use an operational amplifier (OP-AMP) to regulate the external power. The OP-AMP controls a reference voltage of the OP-AMP to output a fixed output voltage, the reference voltage of the OP-AMP determining a data on/off voltage level input to a data driver.

The reference voltage regulator may use a low drop out (LDO) voltage regulator to regulate the external power. The LDO voltage regulator compares a voltage distributed by resistors coupled in the LDO voltage regulator with the external power to output a fixed output voltage to a terminal of the LDO voltage regulator.

It is another aspect of the present invention a light emission display includes: a plurality of data lines; a plurality of scan lines; a plurality of pixel circuits; a scan driver; a data driver; a panel controller; a power supply; and a display panel. The plurality of data lines transmit data voltages corresponding to image signals. The plurality of scan lines transmit selection signals. The plurality of pixel circuits are coupled to the scan lines and data lines. The scan driver selectively applies selection signals to n number of scan lines. The data driver applies the data voltage corresponding to the image signals to m number of data lines. The panel controller controls red, green, and blue signals (RGB signal), a clock signal, and a vertical/horizontal signal, and sequentially applies these signals to the scan driver and the data driver. The power supply supplies power to the scan driver, the data driver, and the panel controller, converts external power into a regulated direct current (DC) reference voltage, converts the regulated DC reference voltage into a plurality of internal DC power sources to be used in the data driver, and outputs the converted plurality of internal DC power sources. The display panel drives n×m numbers of light emitting cells using signals provided by the scan driver and the data driver, and power supplied by the power supply to display an image thereon.

In a further aspect of the present invention a power supply device includes: an external reference voltage supply; a reference voltage generator; a reference voltage selector; and a voltage converter. The power supply device supplies power to a data driver of a light emission display device. The external reference voltage supply supplies an external reference voltage. The reference voltage generator converts external power into a regulated direct current (DC) reference voltage and outputs the regulated DC reference voltage when the external power is changed. The reference voltage selector selects one of the reference voltages output from the external reference voltage supply and the reference voltage generator, and outputs the selected reference voltage. The voltage converter converts the regulated reference voltage output from the reference voltage selector into a plurality of internal DC power sources to be supplied to the drivers.

The power supply device further includes a controller allowing a direct use of the regulated reference voltage output from the reference voltage selector, or distribution of the regulated reference voltage to be respectively converted into the plurality of internal power sources supplied to the drivers.

The power supply device further includes an external power determiner determining the external voltage variation.

The reference voltage generator uses an operational amplifier (OP-AMP) to regulate the external power. The OP-AMP controls a reference voltage of the OP-AMP, determining a data on/off voltage level input to the data driver so as to output a regulated output voltage.

The reference voltage generator uses a low drop out (LDO) voltage regulator to regulate the external power. The LDO voltage regulator compares voltages distributed by resistors internally coupled to output terminals of the LDO voltage regulator to the external power so as to output a fixed output voltage.

In a further aspect of the present invention a light emission display device includes a plurality of data lines; a plurality of scan lines; a plurality of pixel circuits: a scan driver; a data driver; a panel controller; a power supply; and a display panel. The plurality of data lines transmit data voltages corresponding to image signals. The plurality of scan lines transmit selection signals. The plurality of pixel circuits are coupled to the scan lines and data lines. The scan driver selectively applies selection signals to n number of scan lines. The data driver applies the data voltage corresponding to the image signals to m number of data lines. The panel controller controls red, green, and blue signals (RGB signal), a clock signal, and vertical/horizontal synchronization signals, and sequentially applies the signals to the scan driver and the data driver. The power supply receives an external reference voltage, converts external power into a regulated direct current (DC) reference voltage, selects one of either the external reference voltage or the regulated DC reference voltage, converts the selected reference voltage into a plurality of internal DC power sources to be used in the data driver, and outputs the converted plurality of internal DC power sources. The display panel drives n×m numbers of light emitting cells using signals provided by the scan driver and the data driver, and power supplied by the power supply to display an image thereon.

DETAILED DESCRIPTION

Figure 3:
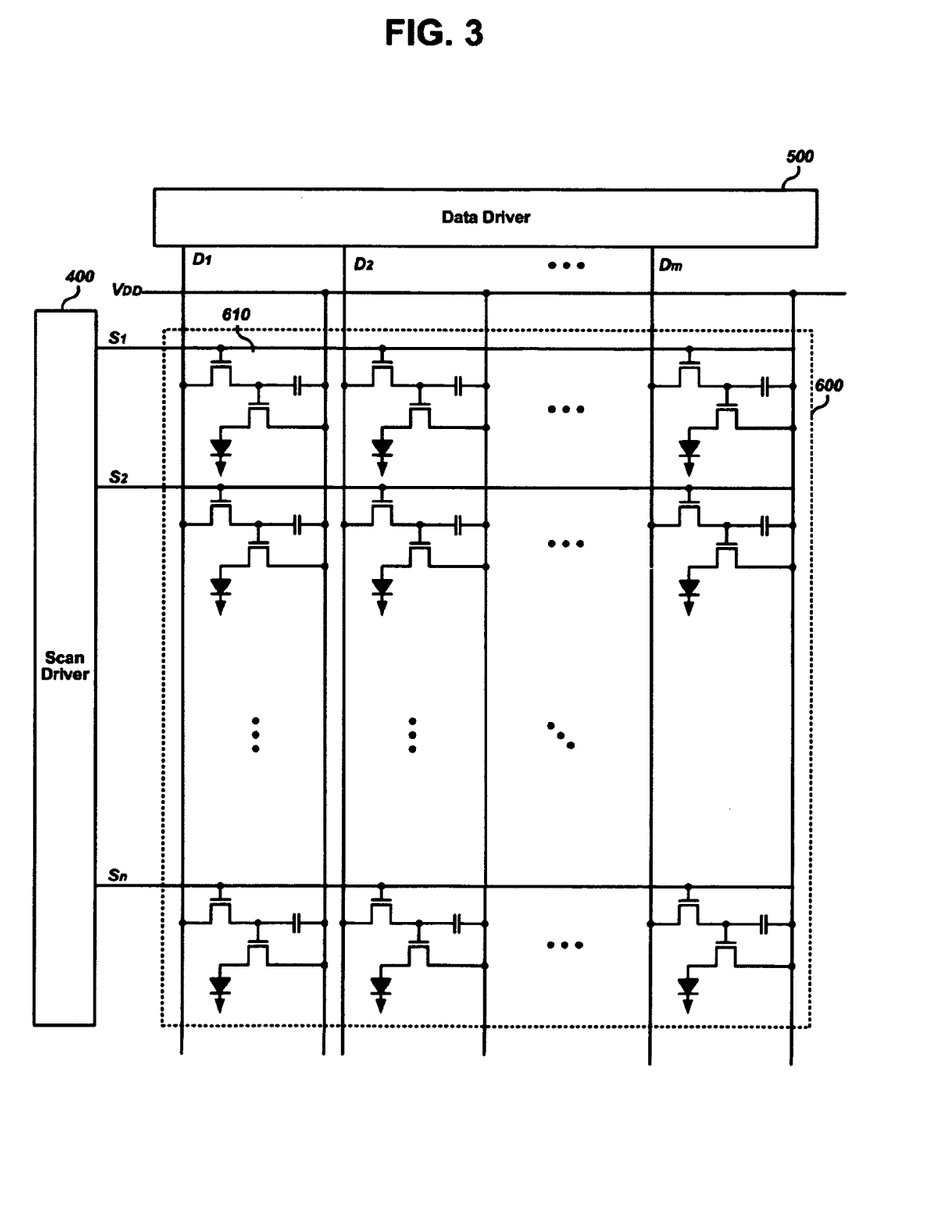
FIG. 3 is an organic EL display panel employing an active matrix method using a thin film transistor according to an embodiment of the present invention.

Referring now to FIG. 3, an OLED in accordance with an exemplary embodiment of the present invention includes an OLED display panel 600, a data driver 400, and a scan driver 500.

The OLED display panel 600 includes data lines D1 to Dm arranged in columns, scan lines S1 to Sn arranged in rows, and n×m numbers of pixel circuits. The data lines D1 to Dm transmit data signals as image signals to the pixel circuits, and the scan lines S1 to Sn transmit selection signals to the pixel circuits. Herein, the pixel circuit is formed on a single pixel area 610 defined by two adjacent data lines D1 to Dm and two adjacent scan lines S1 to Sn.

The scan driver 400 sequentially applies the selection signals to the scan lines S1 to Sn, and the data driver 500 applies a data voltage corresponding to the image signal to the data lines D1 to Dm.

The scan driver 400 and/or the data driver 500 are coupled to the OLED display panel 600. Alternatively, the scan driver 400 and/or the data driver 500 are fabricated as integrated circuits (ICs) and the ICs are mounted on the OLED display panel 600. Alternatively, the ICs are mounted on flexible connecting members such as tape carrier packages (TCPs), flexible printed circuits (FPCs), and the flexible connecting members are attached to the OLED display panel 600 to be coupled thereto.

On the other hand, the scan driver 400 and the data driver 500 may be substituted with driving circuits formed in the OLED display panel 600, which are made of the same layers as the scan lines, the data lines, and the transistors.

Figure 4:
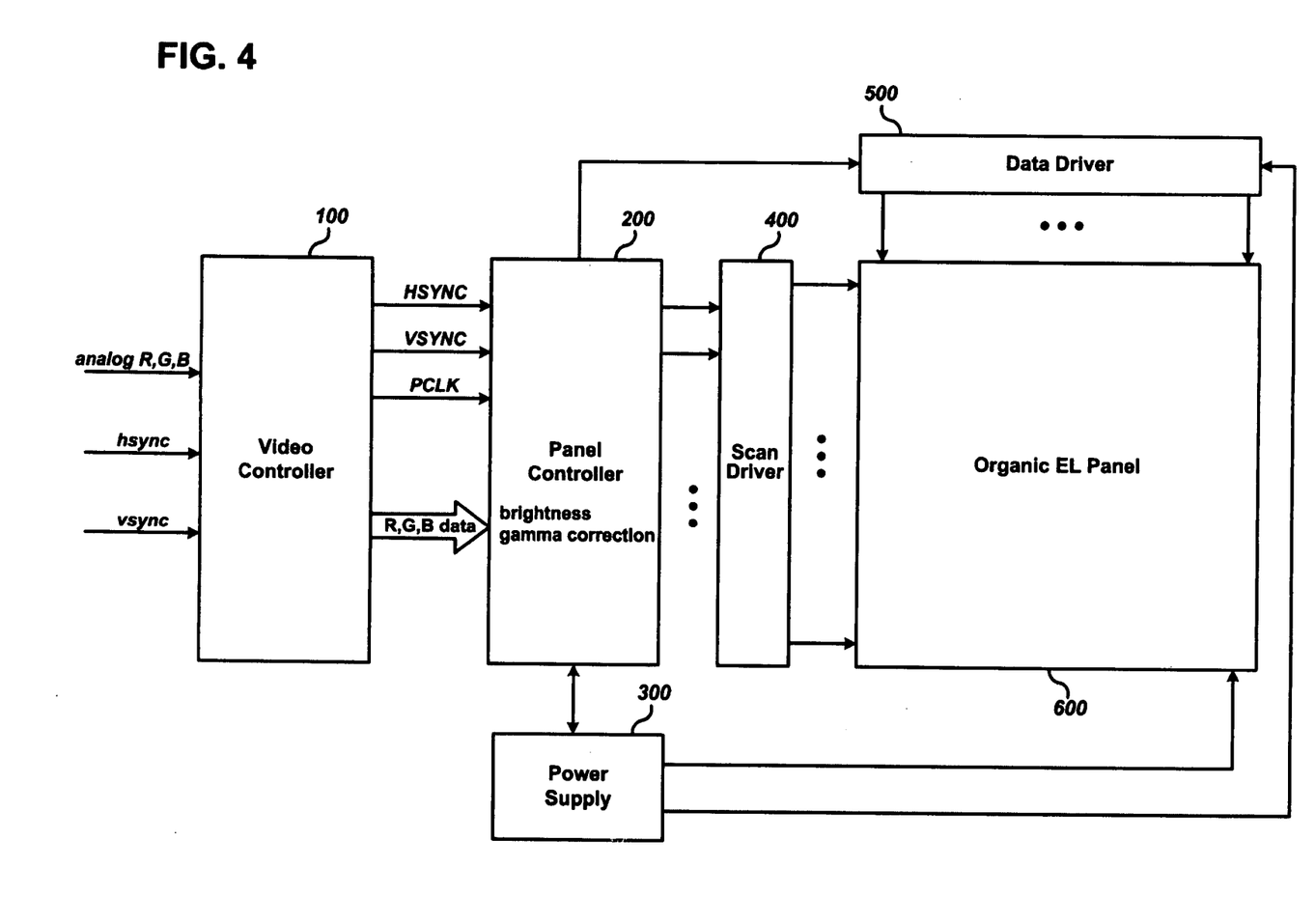
FIG. 4 is a schematic block diagram of an organic EL display device according to an embodiment of the present invention.

FIG. 4 schematically illustrates a block diagram of an OLED display device according to an embodiment of the present invention. The OLED display device includes a video controller 100, a panel controller 200, a power supply 300, a scan driver 400, a data driver 500, and an OLED panel 600. The scan driver 400 and the data driver 500 provide signals passed through an analog interface and a digital interface to the OLED panel 600 in a column direction and a row direction, respectively.

In more detail, analog signals, including red, green, and blue (RGB) signals, and synchronized signals are input to the video controller 100 and converted into digital signals, and the panel controller 200 controls the digital signals to be sequentially input to the scan driver 400 and the data driver 500. The OLED panel 600 displays an image by voltage-driving or current-driving the n×m numbers of organic emitting cells using the signals input to the scan driver 400 and the data driver 500 and power supplied by the power supply 300.

Figure 5:
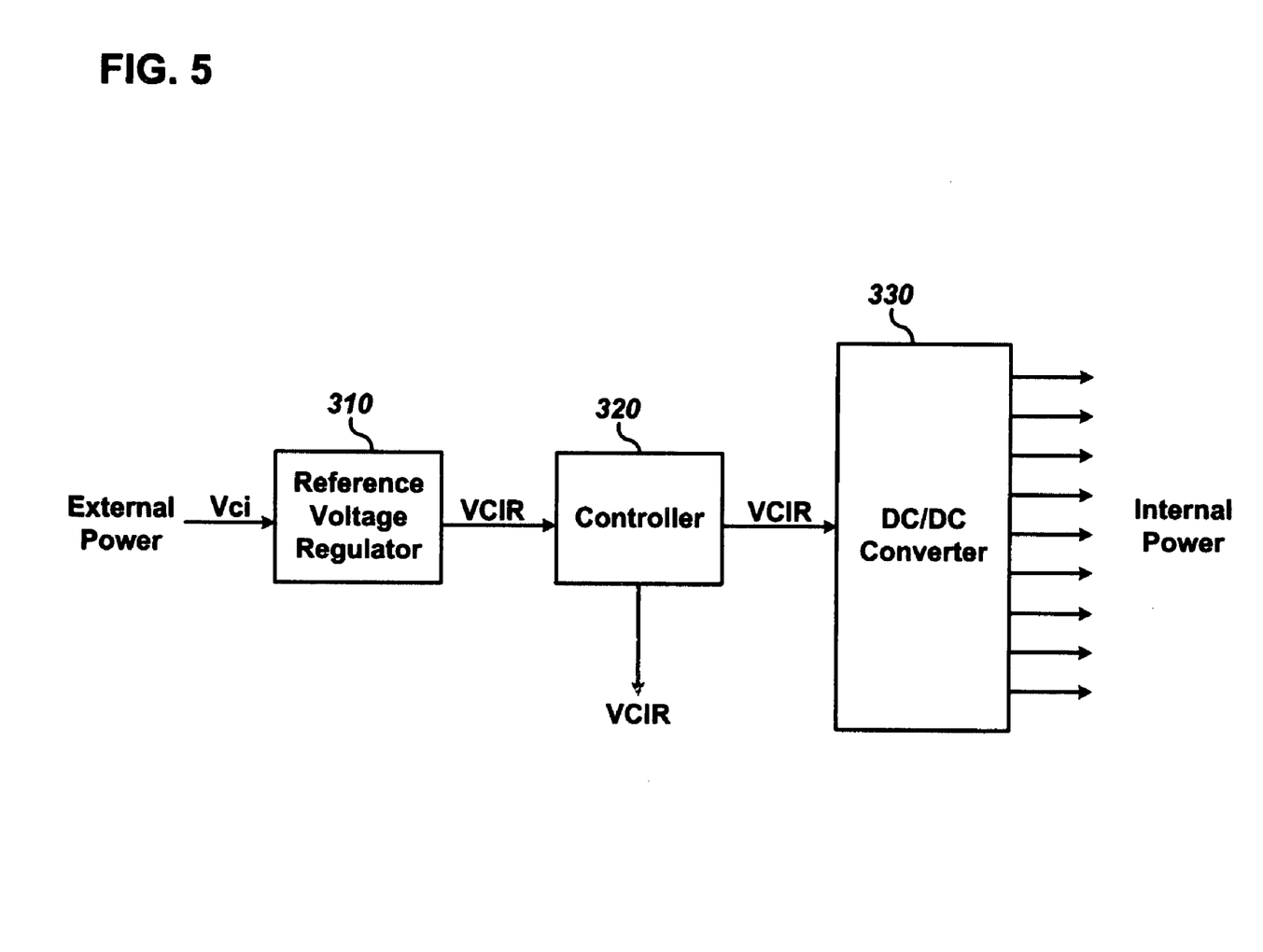
FIG. 5 is a schematic block diagram of a reference voltage regulation circuit of a power supply device for a light emission device according to a first embodiment of the present invention.

FIG. 5 shows a schematic configuration of a regulation circuit for a reference voltage of a power supply device for a light emission display device according to a first embodiment of the present invention. The regulation circuit includes a reference voltage regulator 310 and a controller 320.

The reference voltage regulator 310 regulates external power in a range between 2.5V and 3.3V to 2.0V, and outputs the regulated value.

In more detail, the reference voltage regulator 310 converts an external power (voltage) Vci input to the power supply device supplying power to the data driver of the light emission display device into a regulated direct current (DC) reference voltage VCIR, and outputs a conversion result. Here, the external power input voltage Vci is input from a battery.

The reference voltage regulator 310 regulates the external power by employing an operational amplifier (OP-AMP), and the OP-AMP controls its voltage, determining a data on/off level input to the data driver so as to output a regulated output voltage.

In addition, the reference voltage regulator 310 may employ a low drop out (LDO) voltage regulator so as to regulate the external power, and the LDO voltage regulator compares voltages distributed by resistors internally coupled to output terminals of the LDO voltage regulator to the external power and outputs the regulated output voltage. In general, the LDO voltage regulator includes a bipolar junction transistor (BJT) and a field effect transistor (FET). A more detailed description will be mentioned below with reference to FIG. 8A and FIG. 8B.

Further, the controller 320 distributes the regulated DC reference voltage to be directly used or converted into a plurality of internal DC power sources used in the drivers. The controller 320 provides the regulated DC reference voltage VCIR to a DC/DC converter 330 supplying internal power voltages in a range between −14V and 14V. The controller 320 may simply distribute the regulated reference voltage through a wire, or distribute the regulated reference voltage to several internal circuits following predetermined instructions. In addition, the controller 320 may be integrally provided with the DC/DC converter 330.

In the first embodiment of the present invention, the regulation circuit, for example, the OP-AMP or LDO voltage regulator, is provided to supply a regulated data voltage to an integral circuit of the data driver without regard to variation of the external power. Thus, an output voltage of the regulation circuit can be used as a reference voltage, and the data voltage can be compensated by using the regulated data voltage to thereby prevent brightness variation.

Figure 6:
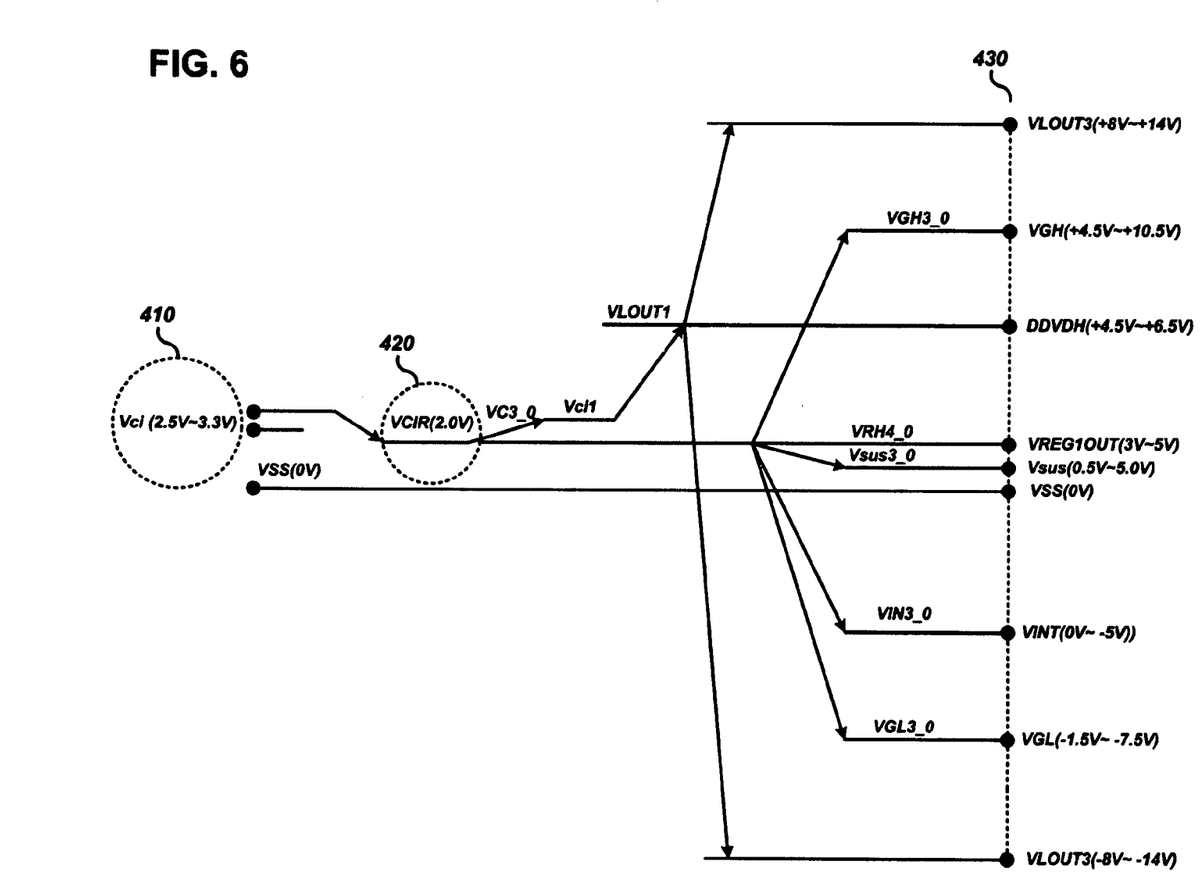
FIG. 6 shows several reference voltages of the light emission device, which are classified by voltage levels.

FIG. 6 illustrates several reference voltages of the power supply device for the light emission display device according to the first embodiment of the present invention, the reference voltages being classified by voltage levels.

As shown therein, external power source 410 has a Vci voltage in the range between 2.5 V and 3.3V. The Vci voltage is input from a battery. In other words, the Vci voltage is converted into a VCIR voltage of 2.0V through the regulation circuit according to the embodiment of the present invention, and the VCIR voltage of 2.0V becomes a reference voltage and the external power 410 thereby supplies power to each of the internal circuits of the light emission display device. As shown in FIG. 6, an output voltage 430 of the DC/DC converter spans from −14V to 14V depending on specified purposes.

Figure 7:
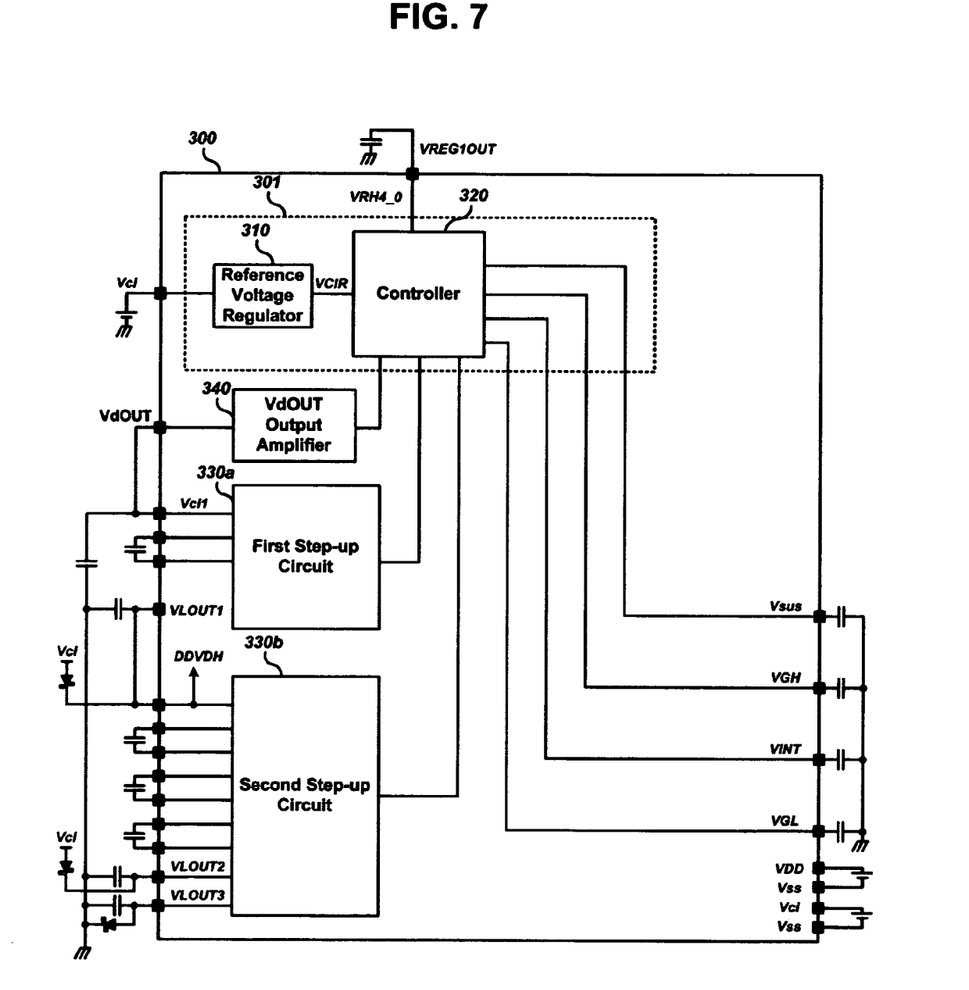
FIG. 7 illustrates a power supply device having a reference voltage regulation circuit for the light emission device according to the first embodiment of the present invention.

FIG. 7 illustrates a power supply device for the light emission display device having the reference voltage regulation circuit according to the first embodiment of the present invention. The power supply device 300 for the light emission display device having the reference voltage regulation circuit according to the first embodiment of the present invention includes a voltage regulation circuit 301 having a reference voltage regulator 310 and a control circuit 320, and first and second step-up circuits 330a, 330b as a DC/DC converter. The power supply device 300 further includes an output amplifier 340 to amplify an output voltage VdOUT, as necessary.

Herein, since the reference voltage regulator 310 and the control circuit 320 are the same as those of FIG. 5, the detailed description related thereto will be omitted.

The external power Vci is external voltage input from a battery, and respectively set to predetermined voltages through a zener-diode. However, the predetermined voltage has a range between 2.5V and 3.3V, and thus quality of the external power may be degraded due to noise or current leakage. To prevent this, the reference voltage regulation circuit is provided to output a reference voltage having a regulated voltage therethrough.

Further, the first and second step-up circuits 330a, 330b output a plurality of internal power voltages having a range between −14V and 14V converted into internal power sources as shown in FIG. 6.

Figure 8A:
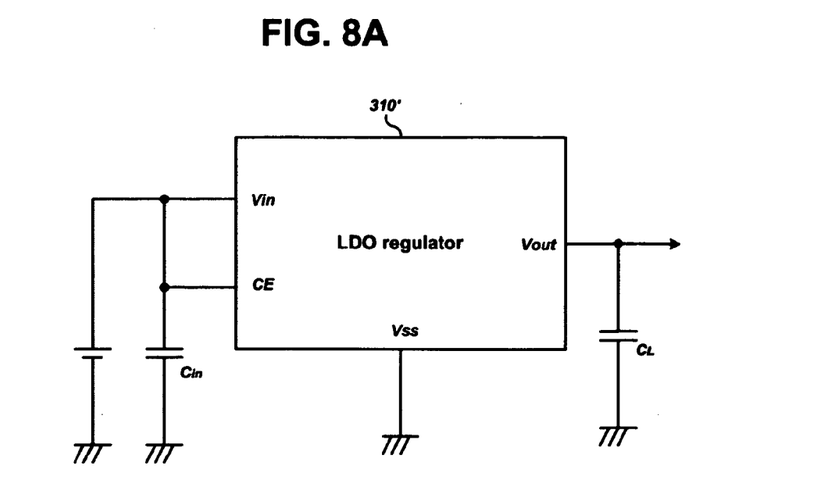
FIG. 8A and FIG. 8B illustrate a reference voltage regulation circuit of a power supply device for a light emission device, the reference voltage regulation circuit being implemented by employing a low drop out (LDO) voltage regulator according to a detailed embodiment of the present invention.
Figure 8B:
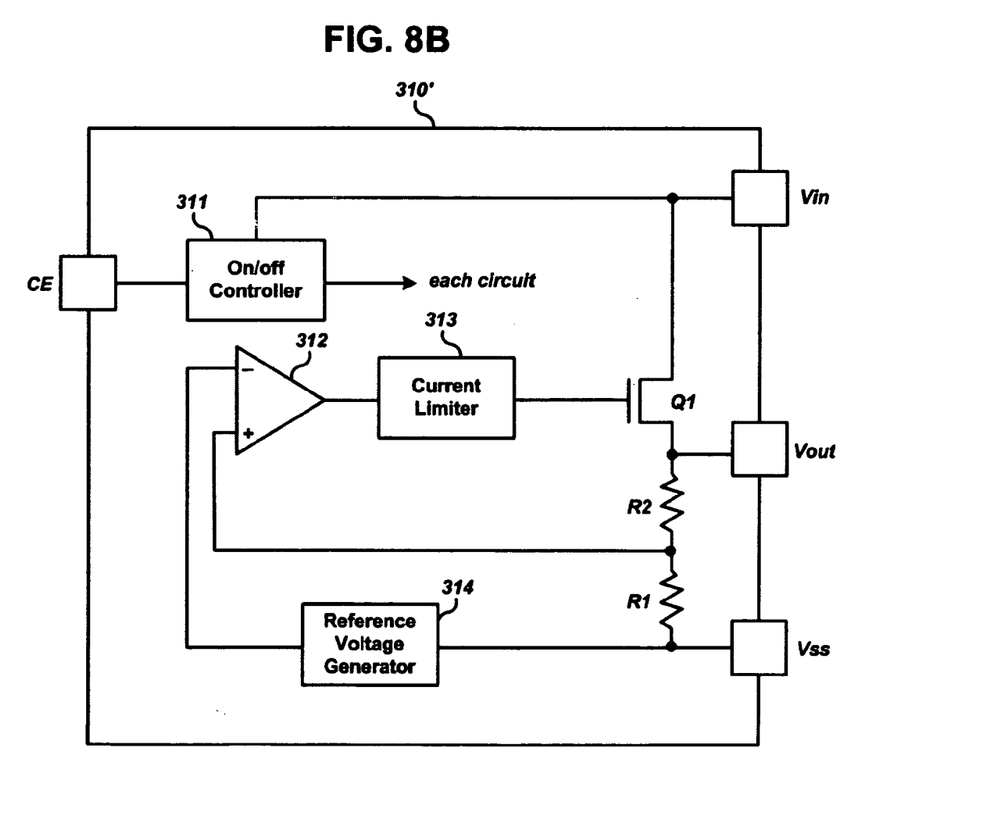

FIG. 8A and FIG. 8B illustrate a reference voltage regulation circuit in the power supply device of the light emission display device implemented as an LDO voltage regulator according to the first embodiment of the present invention.

FIG. 8A schematically shows the reference voltage regulation circuit having a general LDO voltage regulator 310'. The LDO voltage regulator 310' compares voltages distributed by resistors internally coupled to output terminals of the regulator 310' to the external power, and outputs a regulated output voltage. Herein, Cin represents an input capacitor, and $C_L$ represents an output capacitor.

FIG. 8B illustrates an internal configuration of the LDO voltage regulator 310' including: an on/off controller 311; an error amplifier 312; a current limiter 313; a reference voltage generator 314; direct resistors R1 and R2; and a PMOS transistor Q1. With this configuration, the LDO voltage regulator 310' outputs the regulated output voltage resulting from the comparison between the voltages distributed by resistors R1 and R2 internally coupled to the output terminals of the regulator 310 and the external power. Herein, Vin represents an input signal, Vout represents an output signal, and Vss represents a ground voltage. In addition, CE represents an enable signal to control an output voltage on/off. It is well know to those skilled in the art that the configuration of the LDO voltage 310' is not limited to the foregoing configuration shown in FIG. 8B. Configuration of the LDO voltage regulator may vary.

Figure 9:
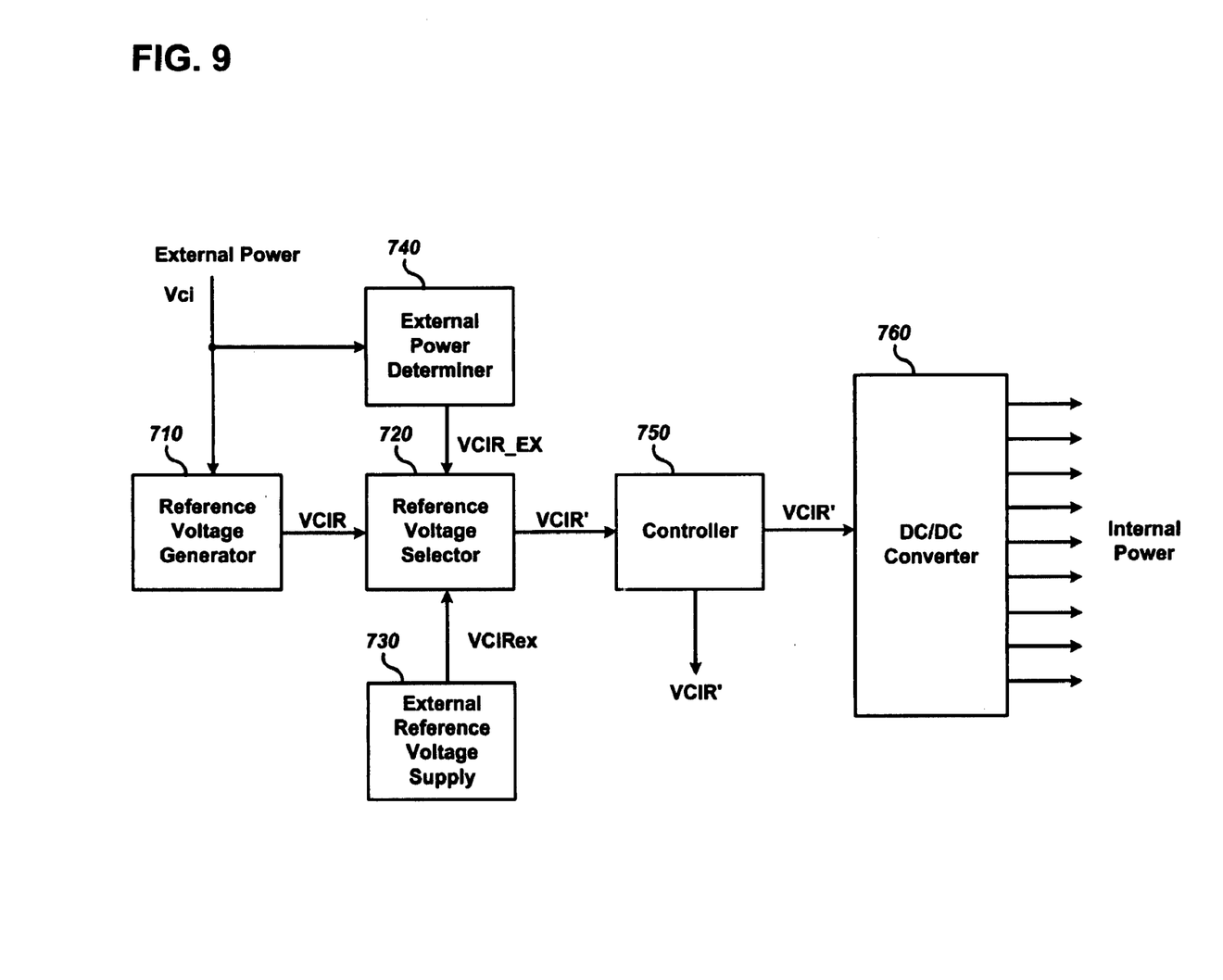
FIG. 9 is a schematic block diagram of a reference voltage selection circuit of a power supply for a light emission device according to a second embodiment of the present invention.

FIG. 9 schematically illustrates the configuration of a reference voltage selection circuit of a light emission display device according to a second embodiment of the present invention. The reference voltage selection circuit according to the second embodiment of the present invention includes: an external reference voltage supply 730; a reference voltage generator 710; a reference voltage selector 720; an external power determiner 740; and a controller 750.

The external reference voltage supply 730 supplies an external reference voltage VICRex to the reference voltage selector 720.

The reference voltage generator 710 converts external power into a regulated DC reference voltage and outputs a result when the voltage of the external power is changed and thus causes the external power to be supplied unstably.

The reference voltage generator 710 regulates the external power having a range between 2.5V and 3.3V to 2.0V and outputs the regulated voltage.

In more detail, the reference voltage generator 710 converts the external power Vci externally input to the power supply device supplying the power to the data driver of the light emission display device into a regulated DC reference voltage VCIR and outputs the regulated DC reference voltage VCIR. Herein, the external power Vci is external power input from a battery.

Herein, the reference voltage generator 710 uses the OP-AMP to regulate the external power, and the OP-AMP controls its voltage determining a data on/off level input to the data driver and outputs a regulated output voltage.

Further, the reference voltage generator 710 uses the LDO voltage regulator to regulate the reference voltage, and the LDO voltage regulator compares a voltage distributed by resistors internally coupled to output terminals of the LDO voltage regulator to the external power, and outputs a regulated output voltage. In general, the LDO voltage regulator includes a bipolar junction transistor (BJT) and a field effect transistor (FET).

The reference voltage selector 720 selects one of the reference voltages input to the external reference voltage supply 730 or the reference voltage generator 710, and outputs the selected reference voltage VCIR'.

The external power determiner 740 determines a voltage variation of the external power. For example, the external power determiner 740 activates an internal reference voltage generating mode when an address of an external reference voltage determination signal VCIR_EX is 0 to generate a stable reference voltage VCIR from the external power Vci, whereas the external power determiner 740 controls the external power to use it as the reference voltage VCIR and outputs it as a reference voltage VCIR', selected by the reference voltage selector 720 when the address of the external reference voltage determination signal VCIR_EX is 1.

Further, the controller 750 allows a direct use of the regulated reference voltage or distributes the regulated reference voltage to be used as a plurality of internal power sources by way of conversion in the driver. Herein, the controller 750 provides the regulated reference voltage VCIR' to a DC/DC converter 760 providing a plurality of internal power sources ranging between −14V and 14V. The controller 750 may distribute the regulated reference voltage through a wire, or distribute the regulated reference voltage through several internal circuits following predetermined instructions. In addition, the controller 750 may be integrally provided with the DC/DC converter 760.

According to the exemplary embodiments of the present invention, the regulation circuit, for example the OP-AMP or LDO voltage regulator, is provided to supply a regulated data voltage to an integral circuit of the data driver without regard to variation of the external power. Thus, an output voltage of the regulation circuit can be used as a reference voltage, and the data voltage can be compensated by using the regulated data voltage and thereby prevent brightness variation.

Figure 10:
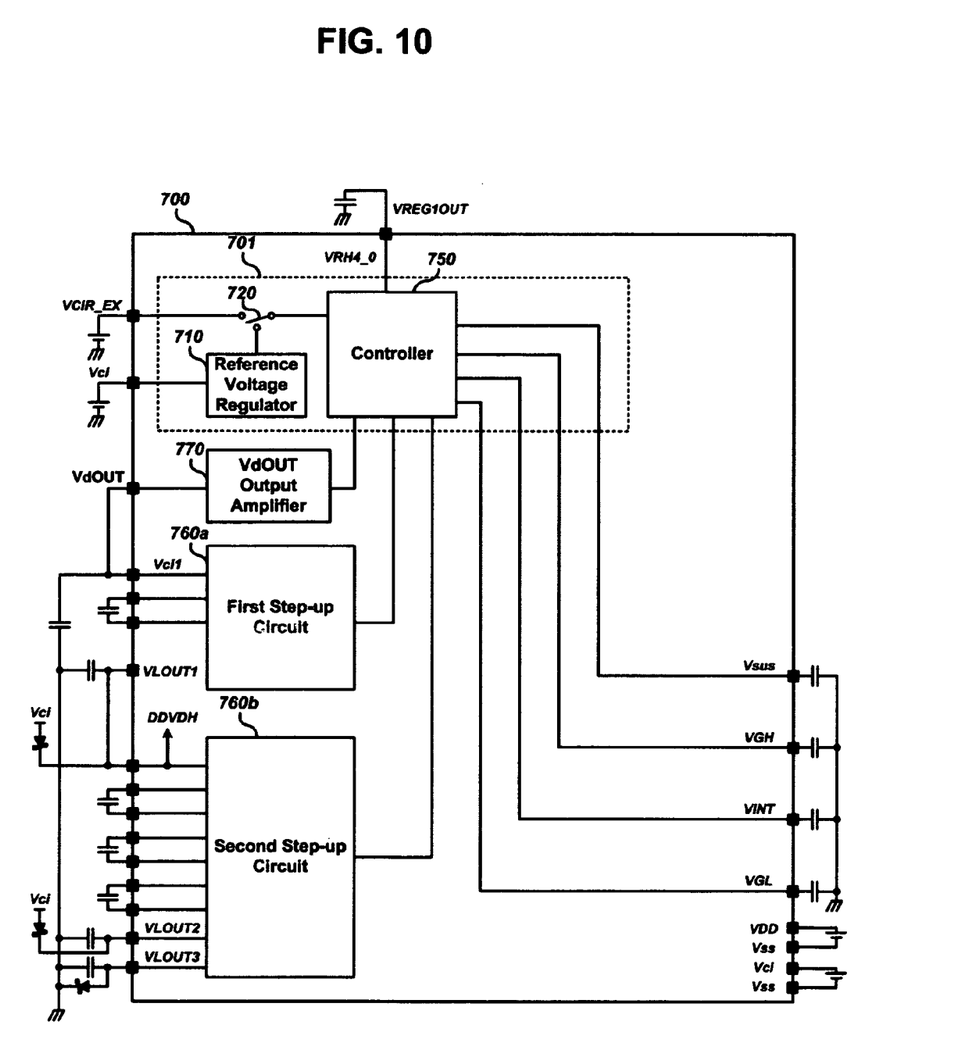
FIG. 10 illustrates a power supply device having a reference voltage regulation circuit for the light emission device according to the second embodiment of the present invention.

FIG. 10 illustrates a power supplying device for a light emission device having a reference voltage selection circuit according to a second embodiment of the present invention.

As shown therein, a power supply device 700 for a light emission device having a reference voltage selection circuit according to the second embodiment of the present invention includes: a voltage regulation circuit 701; a reference voltage generator 710; a reference voltage selector 720; and a controller 750; and first and second step-up circuits 760a and 760b as a DC/DC converter. Further, the power supply device 700 further includes an output amplifier 770 for amplifying an output voltage VdOUT, as necessary.

As shown in FIG. 10, the reference voltage generator 710 converts the external power into a regulated DC reference voltage, selects one of the reference voltages output from the external reference voltage supply and the reference voltage generator 710, and outputs the selected reference voltage VICR' when an input external voltage Vci is changed. Herein, the reference voltage generator 710, the reference voltage selector 720, and the controller 750 are the same as shown in FIG. 9, and therefore a detailed description related thereto will be omitted.

The external voltages Vci are external voltages input from a battery, and respectively set to predetermined voltages by a zener-diode. However, the predetermined voltage has a range between 2.5V and 3.3V as described, and thus the quality of the external power may be degraded due to noise or current leakage. Therefore, the use of the reference voltage regulation circuit is recommended to output a reference voltage having a regulated voltage therethrough.

Further, the first and second step-up circuits 760a, 760b output a plurality of internal power voltages at a range between −14V and 14V, which are converted into internal power sources respectively, as shown in FIG. 6.

According to the first and second embodiments of the present invention, a regulated voltage is supplied to the data driver of the light emission device, thereby preventing non-uniform brightness due to data voltage variation.

Accordingly, the present invention provides a regulated reference voltage to the light emission display device regardless of external power variation and provides a regulated voltage to the data driver of the light emission display device, thereby preventing non-uniform brightness due to data voltage variation.

Further, the present invention selects one of either a regulated reference voltage or a regulated external reference voltage to provide a more regulated voltage to the data driver of the light emission display device, thereby preventing non-uniform brightness due to the data voltage variation.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A power supply device supplying power to a light emission display device, the power supply device comprising:
    a reference voltage regulator converting external power into a regulated direct current reference voltage, and outputting the regulated direct current reference voltage; and
    a voltage converter converting the regulated direct current reference voltage output from the reference voltage regulator into a plurality of internal direct current power sources to be respectively supplied to a driver of the power supply device.

2. The power supply device according to claim 1, further comprising a controller allowing a direct use of the regulated reference voltage, or distributing the regulated reference voltage to respectively be converted into a plurality of internal direct current power sources for the driver.

3. The power supply device according to claim 1, wherein the reference voltage regulator uses an operational amplifier to regulate the external power.

4. The power supply device according to claim 3, wherein the operational amplifier controls a reference voltage of the operational amplifier to output a fixed output voltage, the reference voltage of the operational amplifier determining a data on/off voltage level input to a data driver.

5. The power supply device according to claim 1, wherein the reference voltage regulator uses a low drop out voltage regulator to regulate the external power.

6. The power supply device according to claim 5, wherein the low drop out voltage regulator compares a voltage distributed by resistors coupled in the low drop out voltage regulator with the external power to output a fixed output voltage to a terminal of the low drop out voltage regulator.

7. A light emission display comprising:
    a plurality of data lines transmitting data voltages corresponding to image signals;
    a plurality of scan lines transmitting selection signals;
    a plurality of pixel circuits coupled to the scan lines and data lines;
    a scan driver selectively applying selection signals to n number of scan lines;
    a data driver applying the data voltage corresponding to the image signals to m number of data lines;
    a panel controller controlling red, green, and blue signals, a clock signal, and vertical/horizontal synchronization signals, and sequentially applying the signals to the scan driver and the data driver;
    a power supply supplying power to the scan driver, the data driver, and the panel controller, converting external power into a regulated direct current reference voltage, converting the regulated direct current reference voltage into a plurality of internal direct current power sources to be used in the data driver, and outputting the converted plurality of internal direct current power sources; and
    a display panel driving n×m numbers of light emitting cells using signals provided by the scan driver and the data driver, and power supplied by the power supply to display an image thereon.

8. A power supply device supplying power to a data driver of a light emission display device, the power supply device comprising:
    an external reference voltage supply supplying an external reference voltage;
    a reference voltage generator converting external power into a regulated direct current reference voltage and outputting the regulated direct current reference voltage when the external power is changed;
    a reference voltage selector selecting one of the reference voltages output from the external reference voltage supply and the reference voltage generator, and outputting a selected reference voltage; and
    a voltage converter converting the regulated reference voltage output from the reference voltage selector into a plurality of internal direct current power sources to be supplied to the data driver.

9. The power supply device according to claim 8, further comprising a controller allowing a direct use of the regulated reference voltage output from the reference voltage selector, or distributing the regulated reference voltage to be respectively converted into the plurality of internal direct current power sources used by the data driver.

10. The power supply device according to claim 8, further comprising an external power determiner determining the external voltage variation.

11. The power supply device according to claim 8, wherein the reference voltage generator uses an operational amplifier to regulate the external power.

12. The power supply device according to claim 11, wherein the operational amplifier controls a reference voltage of the operational amplifier, determining a data on/off voltage level input to the data driver so as to output a regulated output voltage.

13. The power supply device according to claim 8, wherein the reference voltage generator uses a low drop out voltage regulator to regulate the external power.

14. The power supply device according to claim 13, wherein the low drop out voltage regulator compares a voltage distributed by resistors coupled in the low drop out voltage regulator with the external power to output a fixed output voltage to a terminal of the low drop out voltage regulator.

15. A light emission display device comprising:
    a plurality of data lines transmitting data voltages corresponding to image signals;
    a plurality of scan lines transmitting selection signals;
    a plurality of pixel circuits coupled to the scan lines and data lines:
    a scan driver selectively applying selection signals to n number of scan lines;
    a data driver applying the data voltage corresponding to the image signals to m number of data lines;
    a panel controller controlling red, green, and blue signals, a clock signal, and vertical/horizontal synchronization signals, and sequentially applying these signals to the scan driver and the data driver;
    a power supply receiving an external reference voltage, converting external power into a regulated direct current reference voltage, selecting one of either the external reference voltage or the regulated direct current reference voltage, converting the selected reference voltage into a plurality of internal direct current power sources to be used in the data driver, and outputting the converted plurality of internal direct current power sources; and a display panel driving n×m numbers of light emitting cells using signals provided by the scan driver and the data driver and power supplied by the power supply to display an image thereon.

* * * * *